UNITED STATES PATENT OFFICE

EMILE SCHEITLIN, OF BASEL, SWITZERLAND

PRODUCTION OF ORGANIC PRODUCTS FROM MEAT PICKLE BRINE

No Drawing. Application filed November 19, 1927, Serial No. 234,554, and in Germany February 28, 1927.

My invention refers to the recovery of valuable organic substances from the brine used in the preservation of meat adapted to be pickled, such as pork, and has for its particular object to save the valuable matter contained in the pickle, which has hitherto been discarded as useless.

In the preservation of meat adapted to be pickled, such as pork, by the wet or dry process the pickle obtained by treating the material with a solution of common salt (brine) has been considered a mere waste product which could not be used for any useful purpose.

I have now found that this pickle contains valuable albuminous matter or intermediate products, and I have further found that these products can be easily recovered free from fat and other foreign matter by precipitation with sulfonic acids.

In the course of my investigations I have ascertained that the salt solution used in pickling meat adapted to be pickled, such as pork, will extract from the material to be preserved the preformed substances which are present therein for the purpose of regeneration, by plasmolysis. That plasmolytic processes occur in the preservation of meat was hitherto unknown.

The compounds obtainable in accordance with the present invention are closely related to the press juice obtained by the pressing out of meat. Now such press juice is very valuable for pharmaceutical purposes but its price is very high inasmuch as the meat from which such juice has been obtained can merely be used as fodder for animals. In contradistinction thereto the valuable constituents of the press juice are recovered according to the present invention in a very simple and inexpensive manner.

*Example 1.*—To 100 liters pickle resulting in the pickling of meat adapted to be pickled, such as pork, is gradually added a dilute solution of sulfonic acid such as for example a 10 per cent solution, until no further solid matter is precipitated, the precipitate is separated from the liquor by filtration and is now dried, preferably in vacuo. The dry product is light coloured. While being partly soluble in a solution of common salt before the drying, this solubility diminishes in proportion to the temperature at which the drying is effected. The product is insoluble in acids and ordinary organic solvents, but partly soluble and emulsifiable in dilute alkaline liquids, the dissolved parts being precipitated from the solution by substances reacting with albumose mixtures. On being heated the product will suffer carbonization.

*Example 2.*—To 100 liters pickle obtained in pickling meat adapted to be pickled, such as pork, are added 5 liters of a 10 per cent guaiacol sulfonic acid. At first the acid is absorbed altogether and the liquid does not show an acid reaction with congo. However after some time the sulfonic acid is only partly absorbed while another part combines with the organic matter, a third part reacting with the sodium chloride in solution to form sodium guaiacol sulfonate and hydrochloric acid. The liquor shows a vigorous acid reaction with congo, even before all albuminous matter has been converted into the double compound and has separated out. The organic sulfonic acid is therefore added until precipitation has come to an end.

The product thus obtained contains the aromatic sulfonic acid in combination. Its properties are similar to those described with reference to Example 1, however its solubility is considerably lower and slower.

The guaiacol sulfonic acid can be replaced by other sulfonic acids of a cyclic character. The double compounds or derivatives thereof, which are thus obtained, are intended to be used as pharmaceutical or technical products.

The products obtained according to Examples 1 and 2 still contain about 10 per cent sodium chloride, the removal of all the salt without any material loss of valuable substances having hitherto proved impossible.

Various changes may be made in the details disclosed in the foregoing specification without departing from the invention or sacrificing the advantages thereof.

I claim:—

1. The method of preparing valuable organic substances from waste meat pickle liquor, comprising acting on the pickle liquor with a sulfonic acid until precipitation ceases and separating and drying the resulting solid matter.

2. The method of preparing valuable organic substances from waste meat pickle liquor comprising acting on the pickle liquor with guaiacol sulfonic acid, until precipitation ceases and separating and drying the resulting solid matter.

3. The product obtained by drying the solid matter precipitated from waste meat pickle liquor with a sulfonic acid, this product being light coloured, insoluble in acids and ordinary organic solvents, but partly soluble and emulsifiable in dilute alkaline liquids, the dissolved parts being precipitated from the solution by substances reacting with albumose mixtures.

In testimony whereof I affix my signature.

EMILE SCHEITLIN.